United States Patent
Iwata et al.

(10) Patent No.: US 7,719,865 B2
(45) Date of Patent: May 18, 2010

(54) POWER CONVERSION APPARATUS

(75) Inventors: Akihiko Iwata, Tokyo (JP); Makoto Seto, Tokyo (JP); Masaki Yamada, Tokyo (JP); Shigeki Harada, Tokyo (JP); Noriyuki Matsubara, Tokyo (JP); Takashi Kumagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 218 days.

(21) Appl. No.: 11/816,456

(22) PCT Filed: Feb. 21, 2006

(86) PCT No.: PCT/JP2006/302997

§ 371 (c)(1),
(2), (4) Date: Aug. 16, 2007

(87) PCT Pub. No.: WO2006/090672

PCT Pub. Date: Aug. 31, 2006

(65) Prior Publication Data

US 2008/0192519 A1    Aug. 14, 2008

(30) Foreign Application Priority Data

Feb. 25, 2005  (JP)  ............................. 2005-050696
Feb. 25, 2005  (JP)  ............................. 2005-050698

(51) Int. Cl.
*H02M 7/49*  (2007.01)
(52) U.S. Cl. .......................... 363/71; 363/132; 323/222
(58) Field of Classification Search ................ 323/222; 363/43, 65, 71, 95, 98, 131, 132; 307/43, 307/45, 82

See application file for complete search history.

(56) References Cited

U.S. PATENT DOCUMENTS 4,052,657 A * 10/1977 Kleiner et al. ................. 363/43

(Continued)

FOREIGN PATENT DOCUMENTS

JP        5-137267 A      6/1993

(Continued)

OTHER PUBLICATIONS

Mabuchi, M., et al.; Development of KP40F Solar Power Conditioner, *Omron Technics*, vol. 42, No. 2, (Serial No. 142), pp. 146-151, (2002).

(Continued)

*Primary Examiner*—Jeffrey L Sterrett
*Assistant Examiner*—Fred E Finch, III
(74) *Attorney, Agent, or Firm*—Leydig, Voit & Mayer, Ltd.

(57) ABSTRACT

In a power conversion apparatus that boosts a solar light voltage, converts it to AC and supplies AC power to a load or system, power loss is reduced and efficiency is improved. An inverter unit, in which AC sides of three single-phase inverters receive DC power from respective sources with a voltage ratio of 1:3:9 as respective inputs are connected in series. Gradational output voltage control of an output voltage is carried out using the sum of the respective generated AC voltages. Also, a solar light voltage is boosted by a chopper circuit to generate the highest voltage DC power source. When the solar light voltage exceeds a predetermined voltage, the boosting of the chopper circuit is stopped, thereby reducing power loss due to the boosting.

30 Claims, 15 Drawing Sheets

U.S. PATENT DOCUMENTS

| | | | | |
|---|---|---|---|---|
| 5,161,097 | A | * | 11/1992 | Ikeda .......................... 363/124 |
| 5,350,997 | A | * | 9/1994 | Ghotbi et al. ................ 323/268 |
| 5,949,668 | A | * | 9/1999 | Schweighofer .............. 363/71 |
| 6,005,788 | A | * | 12/1999 | Lipo et al. .................... 363/71 |
| 6,031,746 | A | * | 2/2000 | Steigerwald et al. .......... 363/71 |
| 6,867,987 | B2 | * | 3/2005 | Cheng et al. .................. 363/43 |
| 7,355,869 | B2 | * | 4/2008 | Okamura .................... 363/132 |

FOREIGN PATENT DOCUMENTS

| | | |
|---|---|---|
| JP | 7-87731 A | 3/1995 |
| JP | 8-205423 A | 8/1996 |
| JP | 2000-243636 | 9/2000 |
| JP | 2003-324990 | 11/2003 |
| JP | 2004-7941 A | 1/2004 |
| JP | 2004-328831 A | 11/2004 |
| JP | 2005-39931 | 2/2005 |

OTHER PUBLICATIONS

U.S. Appl. No. 11/816,029, filed Aug. 10, 2007, Iwata et al.
U.S. Appl. No. 11/816,324, filed Aug. 15, 2007, Iwata et al.

* cited by examiner (a)

| 1 | 3 | 9 | |
|---|---|---|---|
| $V_{1B}$ | $V_{2B}$ | $V_{3B}$ | $V_A$ LEVEL |
| 0 | 0 | 0 | 0 |
| 1 | 0 | 0 | 1 |
| -1 | 1 | 0 | 2 |
| 0 | 1 | 0 | 3 |
| 1 | 1 | 0 | 4 |
| -1 | -1 | 1 | 5 |
| 0 | -1 | 1 | 6 |
| 1 | -1 | 1 | 7 |
| -1 | 0 | 1 | 8 |
| 0 | 0 | 1 | 9 |
| 1 | 0 | 1 | 10 |
| -1 | 1 | 1 | 11 |
| 0 | 1 | 1 | 12 |
| 1 | 1 | 1 | 13 |

RATE OF VOLTAGE USE : ABOUT 1.0

(b)

RATE OF VOLTAGE USE : 0.85

POWER CONVERSION APPARATUS

TECHNICAL FIELD

The present invention relates to a power conversion apparatus that converts DC power to AC power, and particularly to a power conversion apparatus used for a power conditioner or the like that links a decentralized power source to a system.

BACKGROUND ART

In a conventional power conditioner, for example, as seen in a solar power conditioner, the voltage from a decentralized power source that is a solar battery is boosted by using a chopper, and a PWM-controlled inverter is inserted onto the subsequent stage, thus generating an output AC voltage.

A basic operation of such a conventional power conditioner will be described hereinafter. DC power outputted from the solar battery drives an internal control power source of the power conditioner and thus enables an internal circuit to operate. The internal circuit has a chopper circuit and an inverter unit. The chopper circuit boosts the voltage of the solar battery to a voltage that is required for linking to the system. The inverter unit includes four switches and carries out PWM switching to form an output current having a phase synchronous with the system voltage. A strip-like waveform is outputted in this manner, and the time ratio for output is changed to control the average voltage of the output. The outputted voltage is averaged by a smoothing filter provided on the output side, and AC power is outputted to the system (see, for example, non-patent reference 1).

Non-patent reference 1: "Development of Solar Power Conditioner Type KP40F", OMRON TECHNICS, Vol. 42, No. 2 (Serial No. 142) 2002

DISCLOSURE OF THE INVENTION

Problems That the Invention is to Solve

In the conventional power conditioner, which links a solar light voltage to the system, the maximum value of output voltage of the inverter is decided by the magnitude of the boosted voltage by the chopper. Therefore, for example, in the case of outputting AC power of 200 V, a boosted DC voltage of 282 V or higher is necessary and a higher value is usually set in order to give an allowance. The output voltage of the solar light voltage is usually approximately 200 V or lower, and it needs to be boosted to 282 V or higher as described above. If the boosting rate increases, the power loss of the switching device and diode of the chopper unit increases, and there is a problem that the overall efficiency of the power conditioner is lowered.

This invention has been made in order to solve the above problems. It is an object of the invention to reduce power loss of each unit and improve conversion efficiency in a power conversion apparatus that converts power from a DC power source such as solar light to AC and outputs AC to a system and load.

Means for Solve the Problems

In a first power conversion apparatus according to the invention, AC sides of plural single-phase inverters that convert DC power of DC power sources to AC power are connected in series, and gradational output voltage control operation of an output voltage is carried out by using the sum of generated voltages from a predetermined combination selected from the plural single-phase inverters. The plural DC power sources that serve as inputs of the respective single-phase inverters include a first DC power source having the highest voltage, and another or other plural second DC power sources. Then, the first DC power source is generated by a third DC power source via a booster circuit, and when the voltage of the third DC power source exceeds a predetermined voltage, on-off operation of a switch in the booster circuit is stopped to stop boosting operation.

Also, in a second power conversion apparatus according to the invention, AC sides of plural single-phase inverters that convert DC power of DC power sources to AC power are connected in series, and gradational output voltage control operation of an output voltage is carried out by using the sum of generated voltages from a predetermined combination selected from the plural single-phase inverters. The plural DC power sources that serve as inputs of the respective single-phase inverters include a first DC power source having the highest voltage, and another or other plural second DC power sources. Then, the first DC power source is generated by a third DC power source via a booster circuit, and an output voltage of the booster circuit is set so that the total quantity of power fluctuation due to charging and discharging of the respective second DC power sources via the respective single-phase inverters is equal to a predetermined quantity or less.

Moreover, in a third power conversion apparatus according to the invention, AC sides of plural single-phase inverters that convert DC power of DC power sources to AC power are connected in series, and gradational output voltage control operation of an output voltage is carried out by using the sum of generated voltages from a predetermined combination selected from the plural single-phase inverters. The plural DC power sources that serve as inputs of the respective single-phase inverters include a first DC power source having the highest voltage, and another or other plural second DC power sources. Then, the first DC power source is generated by a third DC power source via a booster circuit, and the first DC power source and each of the second DC power sources are connected with each other via a DC-DC converter. The output pulse width of the single-phase inverter that takes the first DC power source as its input is adjusted so that the total quantity of power fluctuation due to charging and discharging of the respective second DC power sources via the respective single-phase inverters is reduced.

ADVANTAGE OF THE INVENTION

In the first power conversion apparatus according to the invention, a higher output than the output voltage of the booster circuit that boosts the voltage of the third DC power source can be outputted, and the boosting rate of the booster circuit can be reduced, thus reducing the power loss. Also, since on-off operation of the switch in the booster circuit is stopped to stop boosting operation when the voltage of the third DC power source exceeds a predetermined voltage, the power loss due to boosting can be significantly reduced, and a power conversion apparatus with high conversion efficiency can be provided.

In the second power conversion apparatus according to the invention, a higher output than the output voltage of the booster circuit that boosts the voltage of the third DC power source can be outputted, and the boosting rate of the booster circuit can be reduced, thus reducing the power loss. Also, since the output voltage of the booster circuit is set so that the total quantity of power fluctuation due to charging and discharging of the respective second DC power sources via the respective single-phase inverters is equal to a predetermined quantity or less, the quantity of power provided to the second DC power sources from outside can be restrained and the power loss can be restrained. Therefore, a power conversion apparatus with high conversion efficiency can be provided.

In the third power conversion apparatus according to the invention, a higher output than the output voltage of the booster circuit that boosts the voltage of the third DC power source can be outputted, and the boosting rate of the booster circuit can be reduced, thus reducing the power loss. Also, since the first DC power source generated via the booster circuit and the respective second DC power sources are connected with each other via the DC-DC converter and the output pulse width of the single-phase inverter that takes the first DC power source as its input is adjusted so that the total quantity of power fluctuation due to charging and discharging of the respective second DC power sources via the respective single-phase inverters is reduced, the quantity of power provided via the DC-DC converter can be restrained by easy adjustment and the power loss can be restrained. Therefore, a power conversion apparatus with high conversion efficiency can be provided.

BRIEF DESCRIPTION OF THE DRAWINGS

FIG. 4 is a view showing the relation between output pattern and output gradational level of each single-phase inverter according to Embodiment 1 of the invention.

BEST MODE FOR CARRYING OUT THE INVENTION

Embodiment 1

Hereinafter, a power conversion apparatus (hereinafter referred to as power conditioner) according to Embodiment 1 of the invention will be described with reference to the drawings.

Figure 1:
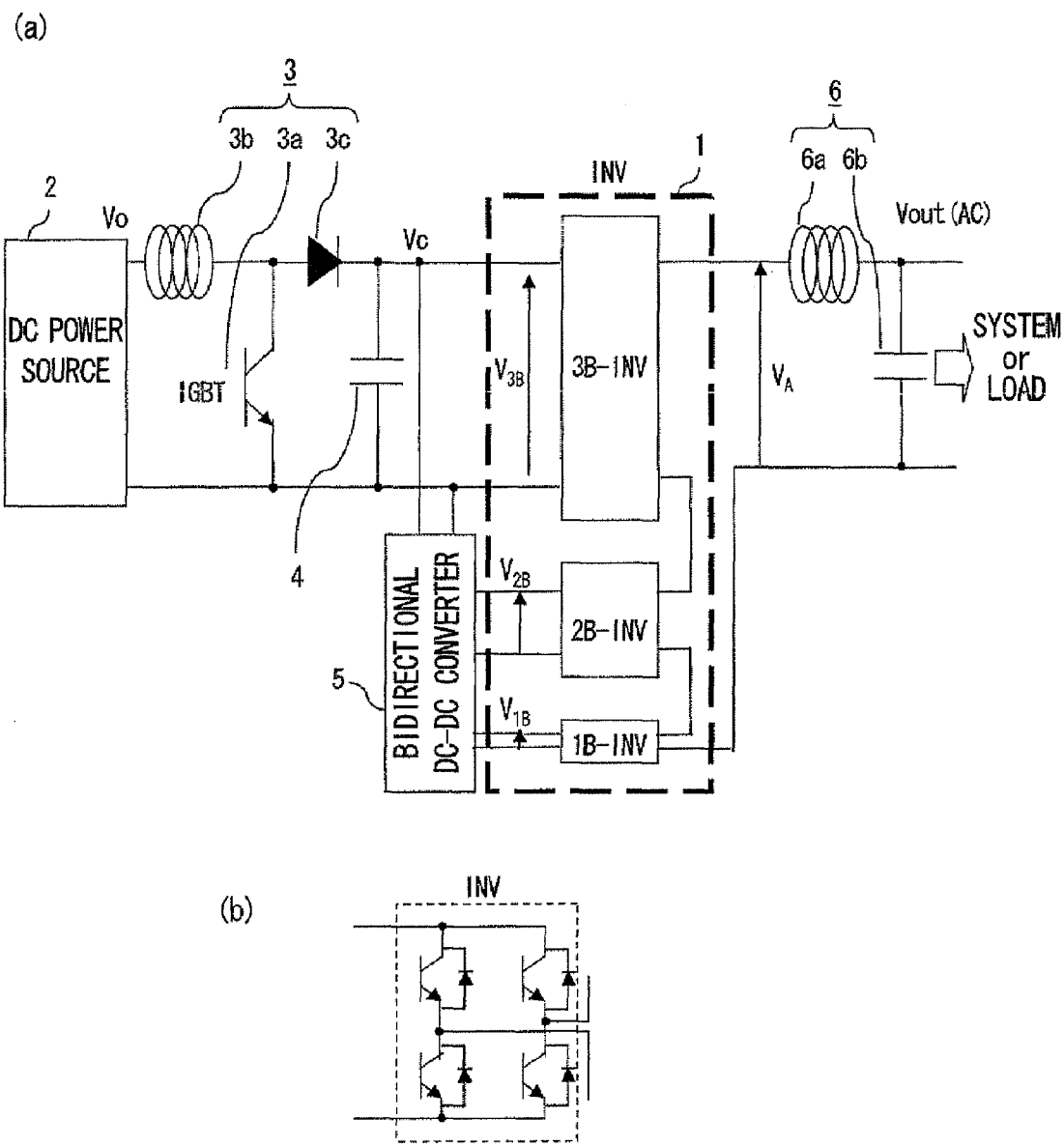
FIG. 1 is a schematic configuration view showing a power conditioner according to Embodiment 1 of the invention.

FIG. 1 is a schematic configuration view showing a power conditioner according to Embodiment 1 of the invention. As shown in FIG. 1(a), AC sides of plural (in this case, three) single-phase inverters 3B-INV, 2B-INV and 1B-INV are connected in series to form an inverter unit 1, which is a single-phase multiple converter. Also, a chopper circuit 3 as a booster circuit including a switching device (hereinafter referred to as switch) 3a such as IGBT, reactor 3b and a diode 3c is installed on a stage subsequent to a DC power source 2 based on solar light as a third DC power source. The chopper circuit 3 boosts a DC voltage $V_O$ acquired at the DC power source 2 and thus provides a voltage $V_C$ charging a smoothing capacitor 4, which serves as a first DC power source.

Each of the single-phase inverters 3B-INV, 2B-INV and 1B-INV includes plural self-turn-off semiconductor switching devices such as IGBTs with diodes connected in inverse-parallel, as shown in FIG. 1(b). They convert DC power to AC power and output it. The DC power sources of the inputs of them are connected with one another via a bidirectional DC-DC converter 5.

These single-phase inverters 3B-INV, 2B-INV and 1B-INV can generate positive, negative and zero voltages. The inverter unit 1 outputs a voltage $V_A$ as the sum of these generated voltages combined, by gradational output voltage control operation. This output voltage $V_A$ is smoothed by a smoothing filter 6 including a reactor 6a and a capacitor 6b and an AC voltage $V_{out}$ is supplied to a system or load.

Also, the DC power source (first DC power source) that serves as the input of 3B-INV is equivalent to the smoothing capacitor 4. Its voltage $V_{3B}(=V_C)$ is larger than voltages $V_{2B}$, $V_{1B}$ of the DC power sources (second DC power sources) that serve as the inputs of the other single-phase inverters 2B-INV and 1B-INV. $V_{3B}$, $V_{2B}$ and $V_{1B}$ are controlled to have a predetermined voltage ratio by the DC-DC converter 5. This DC-DC converter 5 keeps a constant voltage ratio of the DC power sources $V_{1B}$, $V_{2B}$ and $V_{3B}$ of the respective inverters and allows them to supply excess energy to compensate for insufficiency among them.

Since $V_{1B}$, $V_{2B}$ and $V_{3B}$ represent the DC power source voltages of the inverters 1B-INV, 2B-INV and 3B-INV, hereinafter, the DC power sources that serve as the inputs of the inverters are described as the DC power source $V_{1B}$, the DC power source $V_{2B}$ and the DC power source $V_{3B}$, for convenience.

Figure 2:
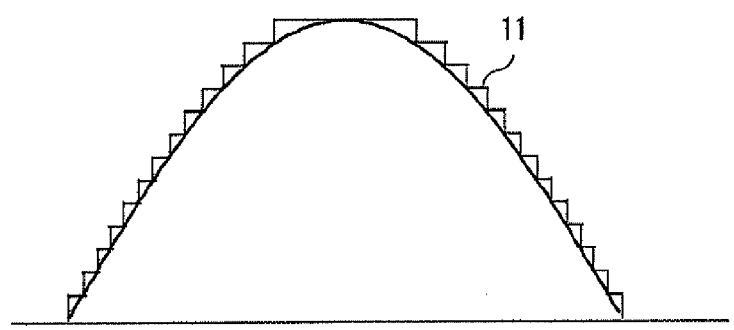
FIGS. 2(a) and 2(b) are a table and graph showing an output pattern and an output voltage waveform of each single-phase inverter according to Embodiment 1 of the invention.
Figure 3:
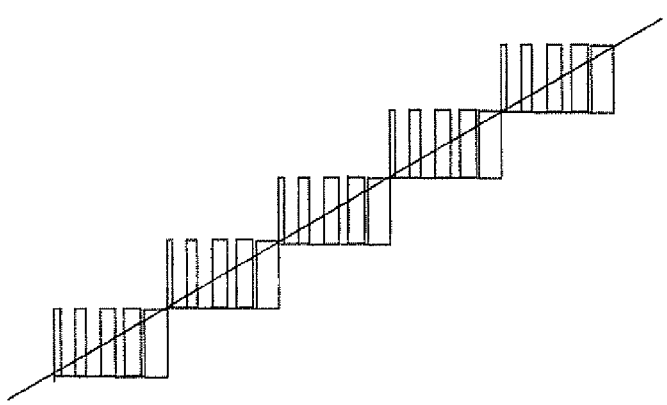
FIG. 3 is a view showing an output voltage waveform under PWM control of the inverter according to Embodiment 1 of the invention.

It is now assumed that the relation between $V_{1B}$, $V_{2B}$ and $V_{3B}$ is 1:3:9. In this case, when output patterns of the three inverters 1B-INV, 2B-INV and 3B-INV are combined well, as shown in FIG. 2(a), output voltages of 14 gradational levels 0 to 13 can be selected as the output voltage $V_A$ of the inverter unit 1. Thus, as shown in FIG. 2(b), the output voltage $V_A$ that has a substantially sine wave-like output voltage waveform 11 is provided and it is inputted to the smoothing filter 6. Moreover, if PWM control is used, too, in each gradational level, the voltage waveform can be controlled more accurately, as shown in FIG. 3. In the output patterns of each inverter shown in FIG. 2(a), 1 represents generation of a positive voltage, −1 represents generation of a negative voltage, and 0 represents generation of zero voltage.

Figure 4:
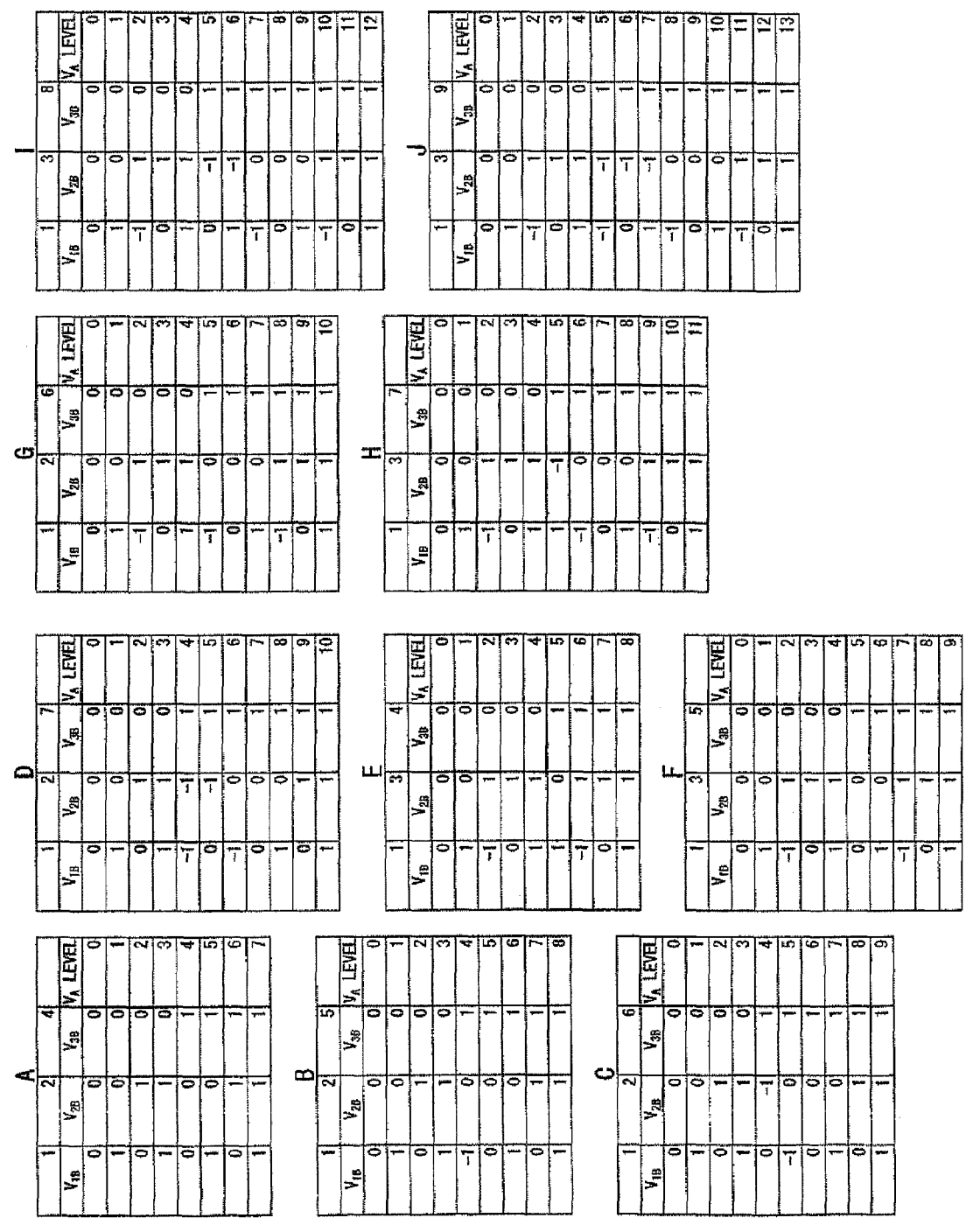

The relation between $V_{1B}$, $V_{2B}$ and $V_{3B}$ may be other than 1:3:9. With various patterns from 1:2:4 to 1:3:9, the output voltage $V_A$ can be continuously changed in the gradational level. Logic tables A to J in FIG. 4 show the relation between the output patterns of the inverters 1B-INV, 2B-INV and 3B-INV and the gradational levels of the output voltage $V_A$ of the inverter unit 1 having these inverters connected in series, for each pattern. For the case of 1:3:9 of these, the number of levels is the largest and a highly accurate output voltage waveform can be expected. If PWM control is used, too, in each gradational level, the voltage waveform can be controlled more accurately. To apply PWM to the voltage output method on each gradational level, it may be necessary to apply PWM control to the outputs of plural single-phase inverters, depending on the relation of the voltages $V_{1B}$, $V_{2B}$ and $V_{3B}$.

Figure 5:
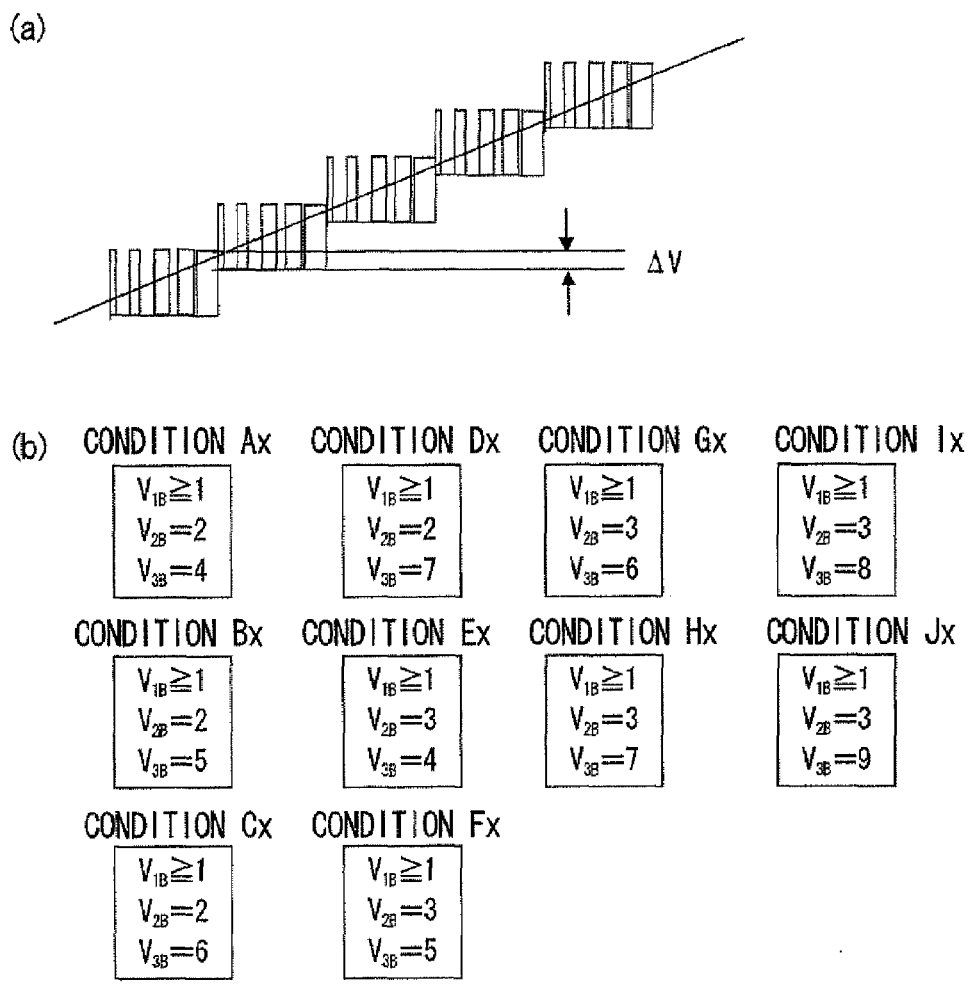
FIGS. 5(a) and 5(b) are a graph and tables showing DC voltage conditions and output voltage waveform of each single-phase inverter according to Embodiment 1 of the invention.

In the case where the use of PWM control is assumed, the voltage of the DC power source $V_{1B}$ may be larger than the value in the relation shown in FIG. 4. Since there is an overlap of ΔV between gradational levels as shown in FIG. 5(a) in addition to the voltage control based on PWM control, more continuous waveform outputs can be made. Conditions Ax to Jx corresponding to the logic tables A to J in FIG. 4 are shown in FIG. 5(b). For example, under the condition Jx, $\Delta V = V_{1B} - V_{3B}/9$ holds.

Meanwhile, the maximum output voltage necessary for an AC output of 200 V is approximately 282 V. The output voltage $V_A$ of the inverter unit 1 can be $V_{1B}+V_{2B}+V_{3B}$ at the maximum. Therefore, if $V_{1B}+V_{2B}+V_{3B}$ is equal to 282 V or higher, the power conditioner can provide an AC output of 200 V. $V_{1B}+V_{2B}+V_{3B}$ is larger than $V_{3B}$, which is the voltage boosted by the chopper circuit 3. For example, if the relation between $V_{1B}$, $V_{2B}$ and $V_{3B}$ is 1:3:9, $V_{1B}+V_{2B}+V_{3B}$ is 13/9 times $V_{3B}$. That is, when $V_{3B}$ is about 195 V or higher, $V_{1B}+V_{2B}+V_{3B}$ is 282 V or higher and this is the condition for an AC output.

Figure 6:
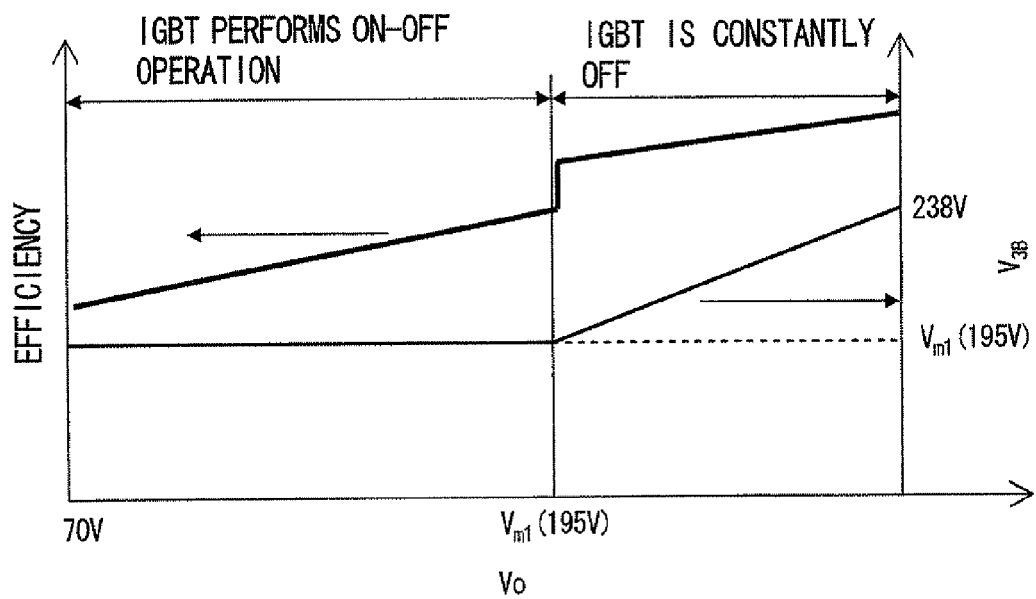
FIG. 6 is a view showing the operation of a chopper circuit according to Embodiment 1 of the invention.

FIG. 6 shows an operation voltage with respect to a solar light voltage in the chopper circuit 3 of such a power conditioner and an estimate efficiency value at the time. As shown in FIG. 6, the DC voltage (solar light voltage) $V_O$ acquired at the DC power source 2 is boosted to a predetermined voltage $V_{m1}$ as the IGBT switch 3a turns on and off up to the predetermined voltage $V_{m1}$ (195 V). When the predetermined voltage $V_{m1}$ is exceeded, the IGBT switch 3a is stopped.

In this manner, if the solar light voltage $V_O$ is 195 V or higher, a predetermined AC output can be provided without the boosting operation. Therefore, the boosting operation by the chopper circuit 3 is stopped at this time. As the solar light voltage $V_O$ increases, the boosting rate is lowered and the efficiency of the chopper circuit 3 improves. However, when the IGBT switch 3a is stopped, the power loss is significantly reduced and there is only a continuity power loss of the diode 3c. Therefore, the efficiency suddenly increases from the point where the solar light voltage $V_O$ reaches 195 V. As it rises further above 195 V, the increase in the solar light voltage $V_O$ causes the current to be lowered and the continuity power loss in the diode 3c is reduced (under the same power condition). Therefore, the overall efficiency of the power conditioner increases.

In this embodiment, the AC side of the single-phase inverter 3B-INV using, as its DC source, the DC voltage $V_{3B}$ boosted from the solar light voltage $V_O$ by the chopper circuit 3, and of the other single-phase inverters 2B-INV and 1B-INV are connected in series, and the power conditioner is thus configured to provide an output voltage based on the sum of the generated voltages from the respective inverters. Therefore, a higher voltage than the DC voltage $V_{3B}$ boosted by the chopper circuit 3 can be outputted, and the boosting rate of the chopper circuit 3 can be reduced, thus reducing the power loss. Also, when a voltage range lower than the maximum value of the output voltage of the power conditioner is employed as the operation range of the voltage $V_{3B}$, the boosting rate of the chopper circuit 3 can be securely reduced and the power loss can be reduced. Moreover, when the solar light voltage $V_O$ exceeds a predetermined voltage $V_{m1}$ (195 V), the IGBT switch 3a is stopped to stop the boosting operation. Therefore, the power loss due to boosting can be significantly reduced as described above, and a power conditioner with high conversion efficiency can be provided.

Embodiment 2

Figure 7:
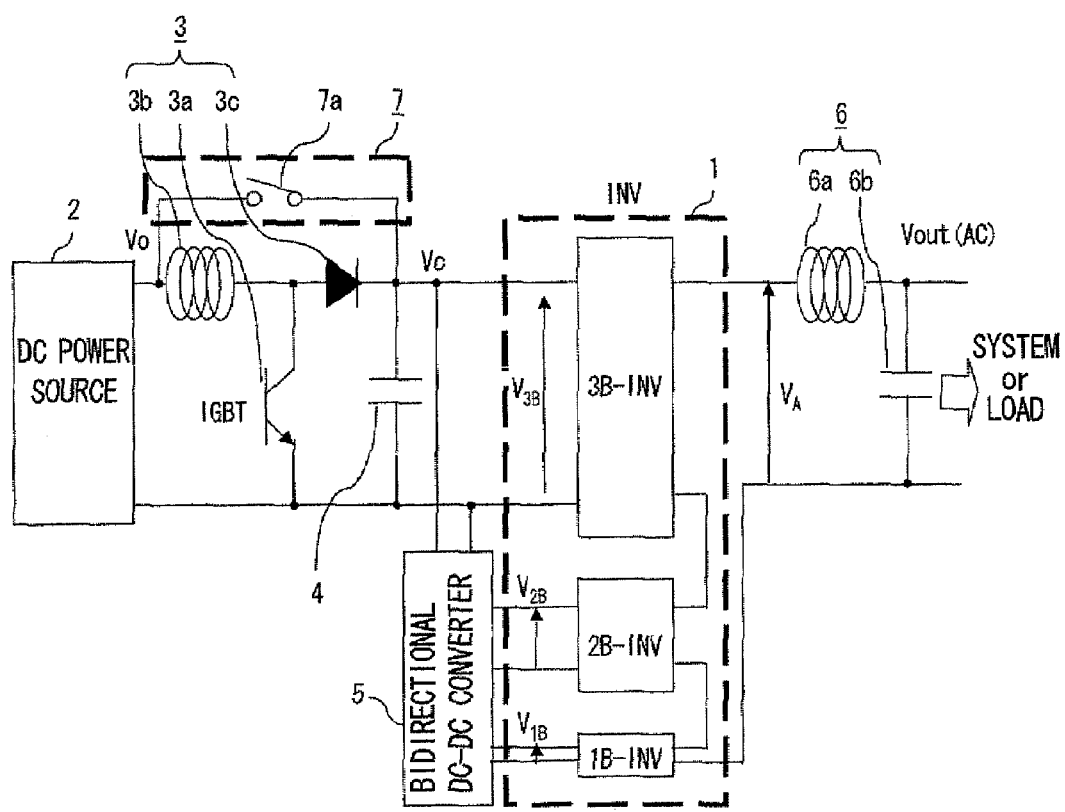
FIG. 7 is a schematic configuration view showing a power conditioner according to Embodiment 2 of the invention.

FIG. 7 is a schematic configuration view showing a power conditioner according to Embodiment 2 of the invention. The power conditioner according to this embodiment is configured by providing a bypass circuit 7 that bypasses the chopper circuit 3 in the power conditioner shown in FIG. 1 of the above Embodiment 1.

As shown in FIG. 7, the chopper circuit 3 boosts a DC voltage $V_O$ acquired at the DC power source 2, and a voltage $V_C$ to charge the smoothing capacitor 4, which serves as the first power source, is provided. Also, to bypass the chopper circuit 3 while stopping the boosting, the bypass circuit 7 including, for example, a relay 7a, is connected parallel to the chopper circuit 3.

As in the above Embodiment 1, the single-phase inverters 3B-INV, 2B-INV and 1B-INV can generate positive, negative and zero voltages as their outputs. The inverter unit 1 outputs a voltage $V_A$ as the sum of these generated voltages combined, by gradational output voltage control operation. This output voltage $V_A$ is smoothed by the smoothing filter 6 including the reactor 6a and the capacitor 6b, and an AC voltage $V_{out}$ is supplied to the system or load.

The operation of the power conditioner in the case where the relation between the DC power sources $V_{1B}$, $V_{2B}$ and $V_{3B}$ of the inverters 1B-INV, 2B-INV and 3B-INV is 1:3:9 will be described hereinafter.

As described above, the maximum output voltage necessary for an AC output of 200 V is approximately 282 V, and the output voltage $V_A$ of the inverter unit 1 can be $V_{1B}+V_{2B}+V_{3B}$ at maximum. Therefore, in order to acquire a predetermined AC output $V_{out}$ in the case where the relation between $V_{1B}$, $V_{2B}$ and $V_{3B}$ is 1:3:9, the chopper circuit 3 must be operated to keep $V_{3B}$ around 195 V or higher.

In the chopper circuit 3, the IGBT switch 3a is turned on and off until the DC voltage (solar light voltage) $V_O$ acquired at the DC power source 2, which serves as its input, reaches a predetermined voltage $V_{m1}$ (195 V), and it is thus boosted to the voltage $V_{m1}$. During this time, the relay 7a of the bypass circuit 7 is left open. Then, the IGBT switch 3a is stopped when the predetermined voltage $V_{m1}$ is exceeded. At this point, the relay 7a of the bypass circuit 7 is closed and a current is caused to flow to the side of the bypass circuit 7, thus bypassing the reactor 3$b$ and the diode 3$c$ of the chopper circuit 3.

Figure 8:
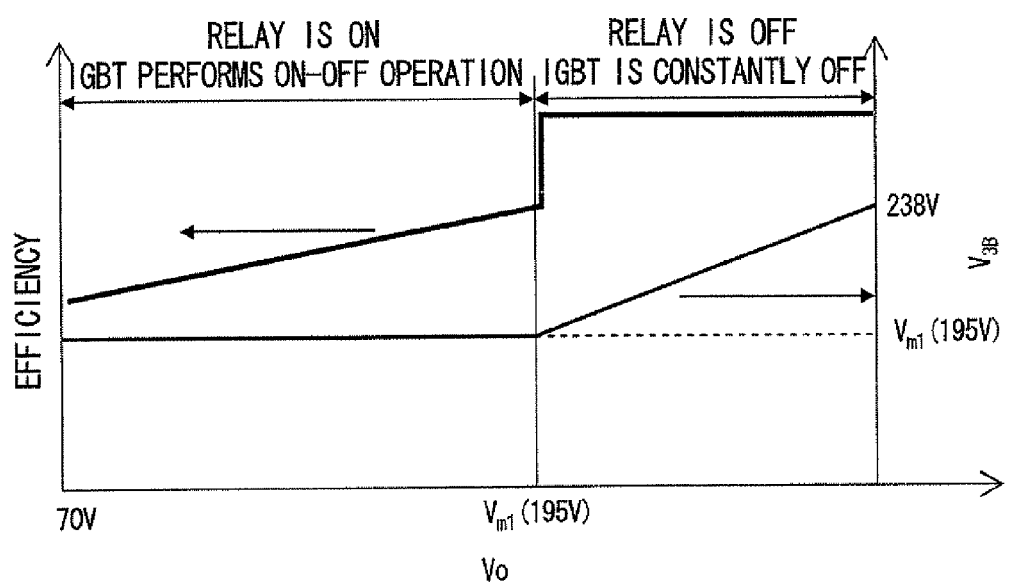
FIG. 8 is a view showing the operation of a chopper circuit according to Embodiment 2 of the invention.

FIG. 8 shows an operation voltage with respect to the solar light voltage $V_O$ in the chopper circuit 3 and an estimate efficiency value at the time.

As shown in FIG. 8, in the range where the solar light voltage $V_O$ is equal to or less than the predetermined voltage $V_{m1}$, the chopper circuit 3 carries out boosting so that the output voltage $V_{3B}$ becomes the predetermined voltage $V_{m1}$. Therefore, as the solar light voltage $V_O$ increases, the boosting rate is lowered and the efficiency of the chopper circuit 3 improves. When the solar light voltage $V_O$ exceeds the predetermined voltage $V_{m1}$, the boosting operation stops and the relay 7$a$ of the bypass circuit 7 is closed to cause a current to flow to the side of the bypass circuit 7. Therefore, there is little power loss. Thus, the efficiency of the chopper circuit suddenly increases from the point where the solar light voltage $V_O$ reaches the voltage $V_{m1}$.

The predetermined voltage $V_{m1}$ at which the boosting operation should be stopped may be approximately 195 V or higher. However, a lower voltage enables further reduction in the power loss of the chopper circuit 3. After the boosting operation is stopped, not only the power loss can be significantly reduced by the stop of the IGBT switch 3$a$, but also the continuity power loss of the reactor 3$b$ and the diode 3$c$ can be eliminated by bypassing the reactor 3$b$ and the diode 3$c$ in the chopper circuit 3. There is almost no power loss in the chopper circuit 3. Therefore, a power conditioner with high conversion efficiency can be provided.

Embodiment 3

The bypass circuit 7 in the above Embodiment 2 will be described in detail hereinafter.

The bypass circuit 7 includes the relay 7$a$ and bypasses one or both of the reactor 3$b$ and the diode 3$c$ connected in series in the chopper circuit 3.

Figure 9:
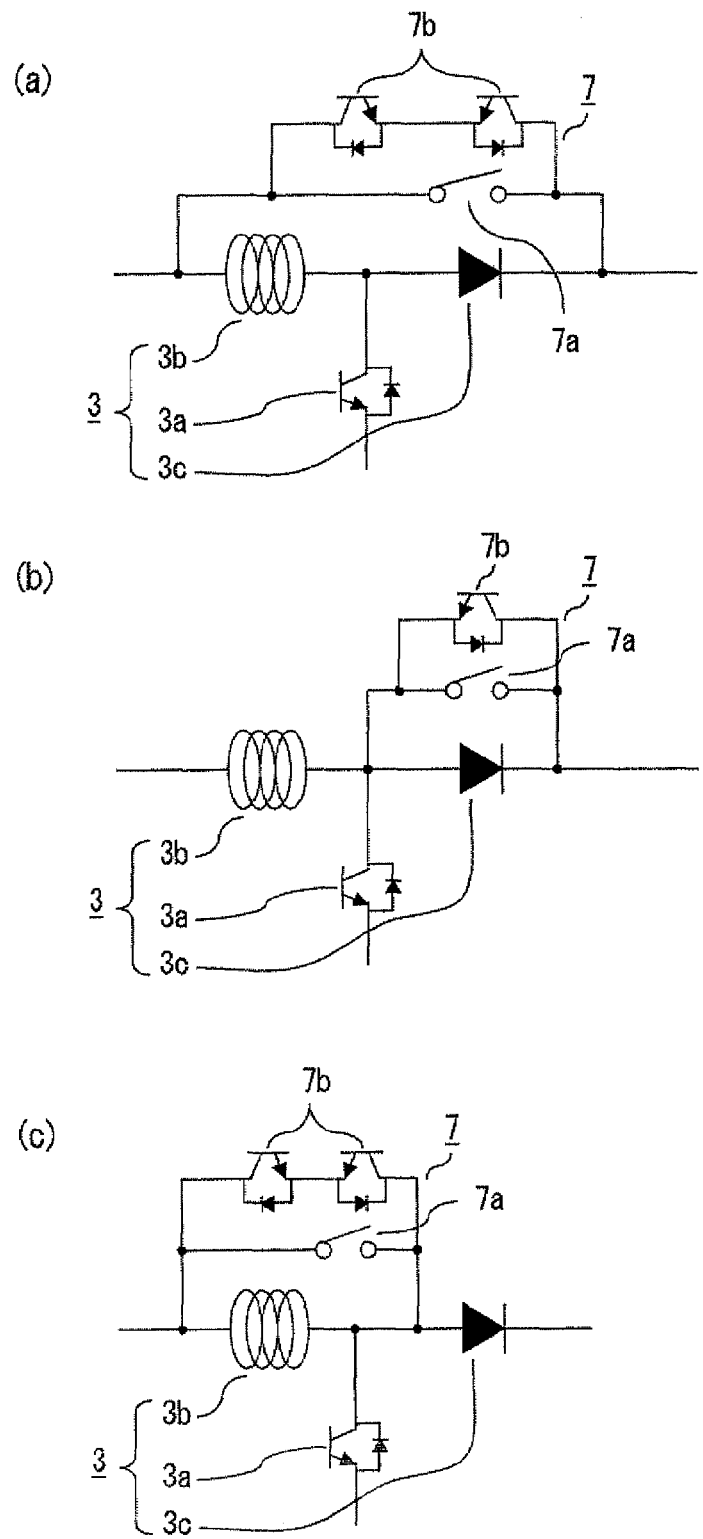
FIGS. 9(a), 9(b), and 9(c) are configurations of a bypass circuits according to Embodiment 3 of the invention.

In FIG. 9($a$), the relay 7$a$ bypasses the reactor 3$b$ and the diode 3$c$, as described in the above Embodiment 2. In FIG. 9($b$), the relay 7$a$ bypasses only the diode 3$c$. In FIG. 9($c$), the relay 7$a$ bypasses only the reactor 3$b$.

Also, a self-turn-off semiconductor switch 7$b$ is connected parallel to the relay 7$a$. Since the relay 7$a$ usually opens with zero current or a low voltage, a DC current is difficult to interrupt. However, it can be easily interrupted when the semiconductor switch 7$b$ is thus provided in parallel. In this case, the semiconductor 7$b$ is turned on at the same time as the relay 7$a$ is opened, and the current is temporarily shifted to the semiconductor switch 7$b$. Thus, the current flowing through the relay 7$a$ is interrupted, and the semiconductor switch 7$b$ is turned off after that.

In any case, when the solar light voltage $V_O$ exceeds the predetermined voltage $V_{m1}$, the IGBT switch 3$a$ is stopped to stop the boosting operation, and the relay 7$a$ of the bypass circuit 7 is closed to cause the current to flow to the side of the bypass circuit 7.

In the case of FIG. 9($a$), since the reactor 3$b$ and the diode 3$c$ in the chopper circuit 3 are bypassed, the continuity power loss of the reactor 3$b$ and the diode 3$c$ can be eliminated and the overall efficiency of the power conditioner increases.

In the case of FIG. 9($b$), since only the diode 3$c$ in the chopper circuit 3 is bypassed, the continuity power loss of the diode 3$c$ can be eliminated and the overall efficiency of the power conditioner increases. In this case, since the reactor 3$b$ is not bypassed, the reactor 3$b$ can be used as a filter.

In FIG. 9($a$) and FIG. 9($b$), since the diode 3$c$ is bypassed, when the DC power source $V_{3B}$ gets higher than the solar light voltage $V_O$, reversal of the current occurs, and additionally, a reverse voltage is applied to the solar panel, which is the DC power source 2. There is a risk of damage to the panel. Therefore, a configuration is made that detects the current flowing through the relay 7$a$, and that opens the relay 7$a$ when the current becomes a predetermined value or less, in order to switch to the current path via the reactor 3$b$ and the diode 3$c$. As the relay 7$a$ is thus opened to make the function of the diode 3$c$ effective, the functions of preventing reversal of the current and of protecting the solar panel from the reverse voltage are provided.

When the relay 7$a$ is opened, even if a reverse current has already been generated because of delay in detection, the current can be temporarily shifted to the semiconductor switch 7$b$ and thus can be securely interrupted.

In the case of FIG. 9($c$), since only the reactor 3$b$ in the chopper circuit 3 is bypassed, the continuity power loss of the reactor 3$b$ can be eliminated and the overall efficiency of the power conditioner increases. Also, since the diode 3$c$ is not bypassed, reversal of the current can be prevented and the solar panel can be protected from the reverse voltage by the diode 3$c$, and reliability can be easily improved. In this case, the relay 7$a$ can be shut off without having the semiconductor switch 7$b$ provided. However, as the semiconductor switch 7$b$ is provided, the relay 7$a$ can also be shut off when anomaly occurs in the diode 3$c$.

Embodiment 4

Next, improvement in the efficiency of the DC-DC converter 5 in the power conditioner having the similar circuit configuration shown in FIG. 1 of the above Embodiment 1 will be described hereinafter.

As shown in FIG. 1, the DC power sources $V_{1B}$, $V_{2B}$ and $V_{3B}$ that serve as the inputs of the inverters 1B-INV, 2B-INV and 3B-INV are connected by the bidirectional DC-DC converter 5. This DC-DC converter 5 keeps the voltage ratio of the DC power sources $V_{1B}$, $V_{2B}$ and $V_{3B}$ of the inverters at a constant value and also allows them to supply excess energy to compensate for insufficiency among them.

Here, it is assumed that the maximum value (peak value) of the AC voltage $V_{out}$ outputted from the power conditioner is Vm, and that the rate of voltage use is $Vm/(V_{1B}+V_{2B}+V_{3B})$. The relation between this rate of voltage use and the quantity of power fluctuation of the DC power sources $V_{1B}$, $V_{2B}$ and $V_{3B}$ due to charging and discharging via the inverters will be described hereinafter.

Figure 10:
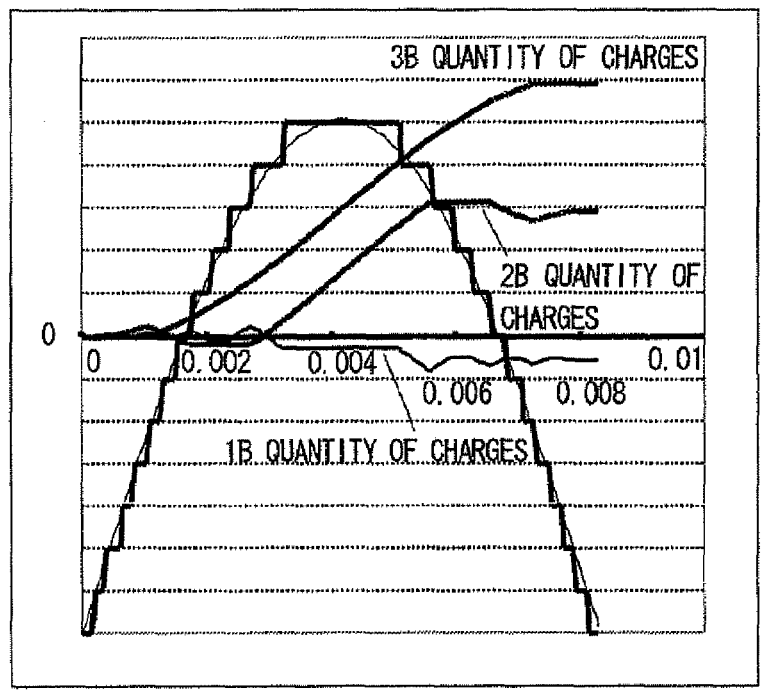
FIGS. 10(a) and 10(b) are graphs showing the quantity of charge flowing out via each single-phase inverter according to Embodiment 4 of the invention.
Figure 10:
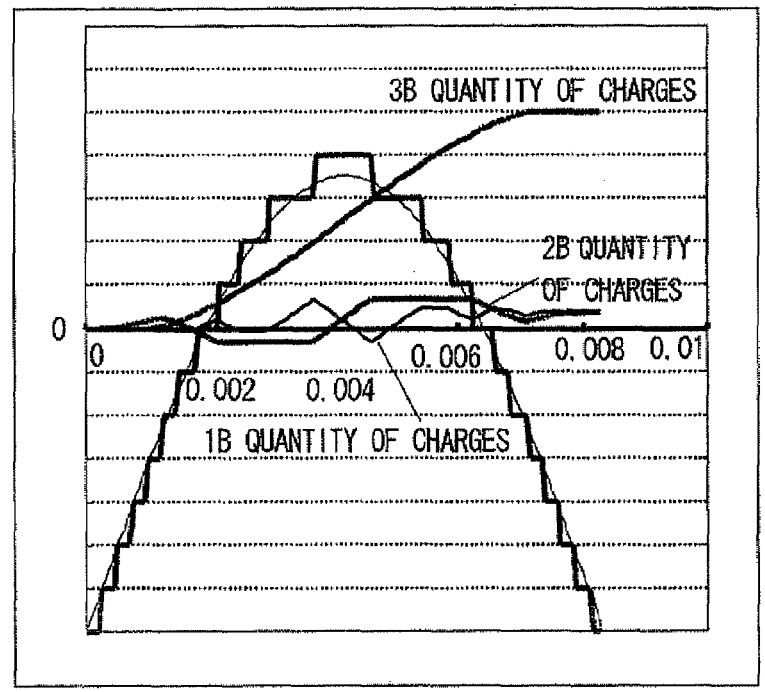

FIG. 10 shows the quantity of charges that flow out via the inverters in the case where the voltage ratio of the DC power sources $V_{1B}$, $V_{2B}$ and $V_{3B}$ of the inverters is 1:3:9 and when a sine-wave current with a power factor of 1 is caused to flow through a load connected to the power conditioner, with respect to the rate of voltage use of 1 and 0.85. In FIG. 10, the 1B quantity of charges, 2B quantity of charges and 3B quantity of charges represent the quantities of charges that have flowed out from the DC power sources $V_{1B}$, $V_{2B}$ and $V_{3B}$ because of charging and discharging via the inverters 1B-INV, 2B-INV and 3B-INV.

As shown in FIG. 10($a$) and FIG. 10($b$), the quantities of charges that flow out from the DC power sources $V_{1B}$ and $V_{2B}$ via the inverters are much smaller for the rate of voltage use of 0.85 than for 1.

Figure 11:
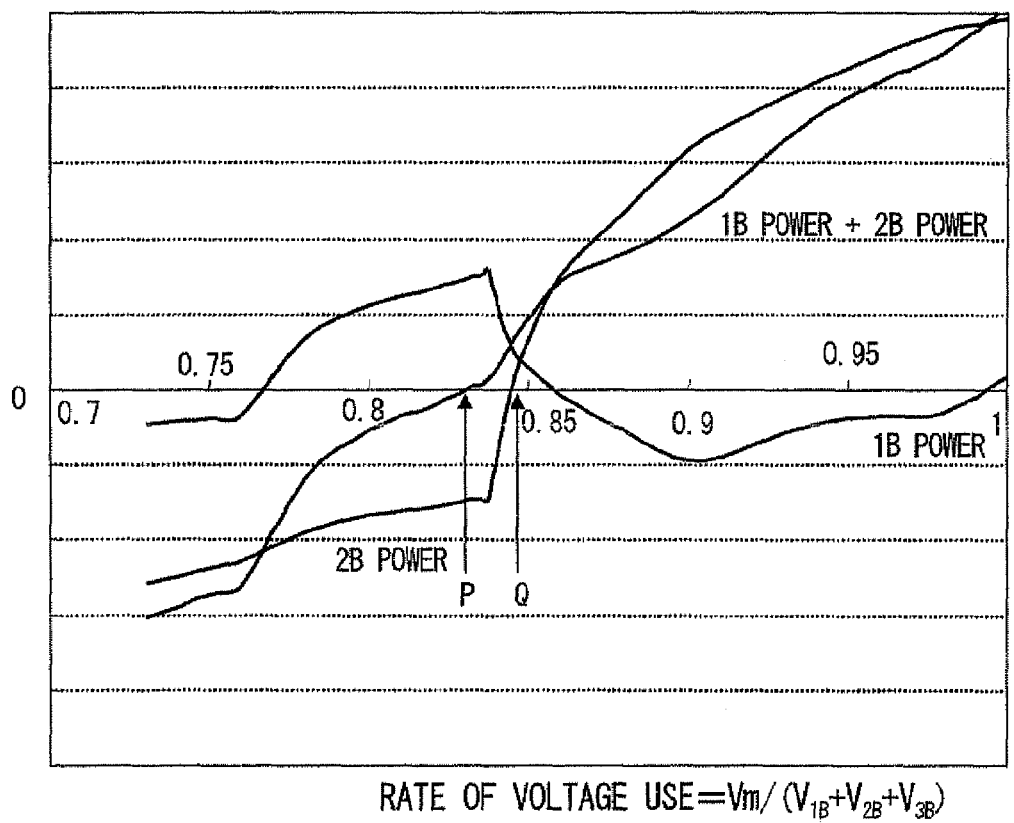
FIG. 11 is a view showing the relation between the quantity of power fluctuation via each single-phase inverter and the rate of voltage use according to Embodiment 4 of the invention.

FIG. 11 shows the quantity of power fluctuation of the DC power sources $V_{1B}$ and $V_{2B}$ due to charging and discharging via the inverters, where the horizontal axis represents the rate of voltage use and the vertical axis represents the quantity of power. The 1B power and 2B power represent the quantity of power fluctuation of the DC power source $V_{1B}$ of 1B-INV and the quantity of power fluctuation of the DC power source $V_{2B}$ of the 2B-INV. The sum of these (1B power+2B power) is also shown. When the quantity of power fluctuation is positive, the quantity of discharging is larger than the quantity of charging. When it is negative, the quantity of charging is larger.

As shown in FIG. 11, (1B power+2B power) is zero when the rate of voltage use is P (=about 0.83). Also, the sum of the absolute value of 1B power and the absolute value of 2B power is minimum when the rate of voltage use is Q (=about 0.845).

According to the above characteristics, in this embodiment, the rate of voltage use of the power conditioner=Vm/$(V_{1B}+V_{2B}+V_{3B})$ is controlled to be P or Q. Thus, the quantity of power fluctuation of the DC power sources $V_{1B}$ and $V_{2B}$ of the inverters 1B-INV and 2B-INV due to charging and discharging via the inverters can be made substantially zero or minimum. Therefore, the quantity of power provided to the DC power sources $V_{1B}$ and $V_{2B}$ from the DC power source $V_{3B}$ (smoothing capacitor 4) of the inverter 3B-INV via the DC-DC converter 5 can be reduced to the minimum. Therefore, the power loss of the DC-DC converter 5 can be reduced and the efficiency of the power conditioner can be improved.

To minimize the quantity of power provided to the DC power sources $V_{1B}$ and $V_{2B}$ from the DC power source $V_{3B}$ (smoothing capacitor 4) via the DC-DC converter 5, the magnitude of (1B power+2B power) may be minimum if the inverters 1B-INV and 2B-INV have the same output pattern. However, if their output patterns are different, the sum of the absolute value of 1B power and the absolute value of 2B power needs to be calculated to find the case where the quantity of power is minimum. Therefore, the rate of voltage use is controlled to be P or Q in accordance with the output patterns of the inverters 1B-INV and 2B-INV.

To achieve the rate of voltage use of P in the power conditioner, for example, when the ratio of $V_{1B}$, $V_{2B}$ and $V_{3B}$ is 1:3:9, $V_{3B}$ should be (Vm/P)×(9/13). The voltage value in this case is $V_{mp}$. For the AC voltage $V_{out}$ of 200 V, Vm is about 282 V and P is about 0.83. Therefore, $V_{mp}$ is about 235 V.

Therefore, as the DC voltage $V_{3B}$ boosted from the solar light voltage $V_O$ by the chopper circuit 3 is made $V_{mp}$ (=about 235 V), the rate of the voltage use of the power conditioner can be controlled to P.

Also to control the rate of voltage use to Q, similarly, $V_{mQ}$=(Vm/Q)×(9/13) should be calculated and the output voltage $V_{3B}$ of the chopper circuit 3 may be made $V_{mQ}$.

Figure 12:
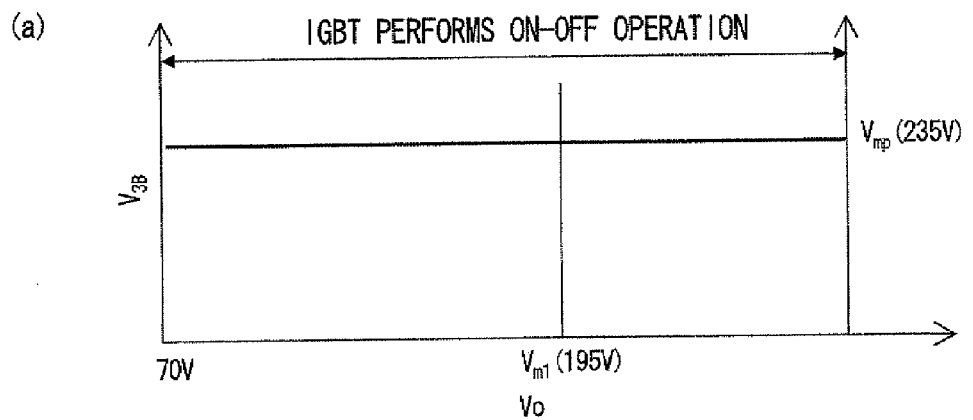
FIGS. 12(a) and 12(b) are graphs showing the operation of a chopper circuit according to Embodiment 4 of the invention.

Next, FIG. 12 shows the operation voltage with respect to the solar light voltage in the chopper circuit 3 of the power conditioner.

FIG. 12(a) shows the case where the rate of voltage use of the power conditioner is constantly P. The IGBT switch 3a continues the on-off operation and the DC voltage (solar light voltage) $V_O$ acquired at the DC power source 2 is constantly boosted to $V_{mp}$ (=about 235 V). Thus, the power loss of the DC-DC converter 5 can be constantly reduced and the efficiency of the power conditioner can be improved.

FIG. 12(b), when boosting is necessary for providing a predetermined AC output, that is, when the solar light voltage $V_O$ is the voltage $V_{m1}$ (195 V) or less described in the above Embodiment 1, the IGBT switch 3a is turned on and off to boost the solar light voltage $V_O$ to $V_{mp}$ (=about 235 V). Then, when the solar light voltage $V_O$ has exceeded the voltage $V_{m1}$, the IGBT switch 3a is stopped.

In this manner, under the condition when boosting is necessary, the voltage is boosted to a voltage that enables reduction in the power loss of the DC-DC converter 5, and in the case where a predetermined AC output can be provided without the boosting operation, the boosting operation of the chopper circuit 3 is stopped and the power loss of the chopper circuit 3 is significantly reduced, leaving only the continuity power loss of the diode 3c. Also, as the solar light voltage $V_O$ increases, the current is lowered and the continuity power loss of the diode 3c is lowered, too. Thus, since the chopper circuit 3 is operated to realize both the reduction in the power loss of the DC-DC converter 5 and the reduction in the power loss of the chopper circuit 3, the overall efficiency of the power conditioner can be improved accurately.

In the above embodiment, the rate of voltage use=Vm/$(V_{1B}+V_{2B}+V_{3B})$ of the power conditioner is controlled to be P or Q. However, as the rate of voltage use is controlled to a value close to P or Q, the quantity of power fluctuation of the DC power sources $V_{1B}$ and $V_{2B}$ via the inverters can be sufficiently reduced, and the quantity of power fluctuation can be controlled to a predetermined quantity or less.

Also, as shown in FIG. 11, if the rate of voltage use is controlled within the range of 0.8 to 0.9, the quantity of power fluctuation can be restrained within a predetermined range and the advantage of reduction in the power loss of the DC-DC converter 5 can be provided.

Also, in the above embodiment, the case where the ratio of $V_{1B}$, $V_{2B}$ and $V_{3B}$ is 1:3:9 is described. However, the relation between the rate of voltage use and the quantity of power fluctuation of the DC power source $V_{1B}$ and $V_{2B}$ due to charging and discharging via the inverters is similar in the patterns shown in FIG. 4 and FIG. 5, though the operating point of the rate of voltage use is different. Therefore, the similar advantage can be provided if the rate of voltage use is controlled to P or Q to reduce the quantity of power fluctuation of the DC power sources $V_{1B}$ and $V_{2B}$ in each case.

Moreover, PWM control may additionally be used for each gradational level of the output voltage $V_A$ of the inverter unit 1 in the above embodiment. Since there is no change in the average output voltage, the similar advantage can be provided.

Embodiment 5

Next, a case where the relation between the voltages of the DC power sources $V_{1B}$, $V_{2B}$ and $V_{3B}$ of the inverters is $V_{1B}=V_{2B}\geq(2/9)\times V_{3B}$ in the power conditioner having the similar circuit configuration shown in FIG. 1 of the above Embodiment 1, will be described. That is, the voltages of the DC power sources $V_{1B}$ and $V_{2B}$ of the inverters 1B-INV and 2B-INV are equal and the total of these two is equal to or larger than $(4/9)\times V_{3B}$.

Figure 13:
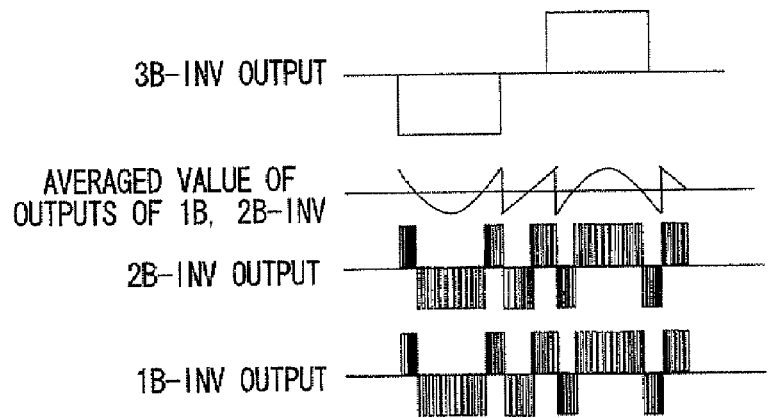
FIG. 13 is a view showing an output voltage waveform of each single-phase inverter according to Embodiment 5 of the invention.

FIG. 13 shows the output voltage waveforms of the inverters 1B-INV, 2B-INV and 3B-INV. As shown in FIG. 13, the inverter 1B-INV and the inverter 2B-INV are caused to produce outputs under PWM control in order to compensate for the difference between the target output voltage and the output voltage of the inverter 3B-INV. In this case since the output of the inverter 1B-INV and the output of the inverter 2B-INV are equal, the quantities of their output power are equal and no power is supplied or received between the DC power sources $V_{1B}$ and $V_{2B}$ via the inverters. Therefore, charges are supplied or demanded to the DC-power sources $V_{1B}$ and $V_{2B}$ of the inverters 1B-INV and 2B-INV from the DC power source $V_{3B}$ of the inverter 3B-INV via the DC-DC converter 5.

Also, the chopper circuit 3 that boosts the solar light voltage $V_O$ is caused to operate with the output voltage $V_{3B}$ being $V_{mp}$ (=(Vm/P)×9/13)), and the rate of voltage use is set at P as shown in FIG. 11 to perform control so that the sum (1B power+2B power) of the quantities of power fluctuating in the DC power sources $V_{1B}$ and $V_{2B}$ due to charging and discharging via the inverters becomes zero. Thus, the quantity of power supplied to the DC power sources $V_{1B}$ and $V_{2B}$ from the DC power source $V_{3B}$ of the inverter 3B-INV via the DC-DC converter 5 can be minimized, and the power loss of the DC-DC converter 5 can be reduced to the minimum. The efficiency of the power conditioner can be improved. Also, since the two inverters 1B-INV and 2B-INV have the same voltage of the DC power sources $V_{1B}$ and $V_{2B}$ and the same output, the configuration of the inverter unit 1 can be simple and easily controlled.

Embodiment 6

Next, a power conditioner according to Embodiment 6 of the invention will be described with reference to the drawings.

Figure 14:
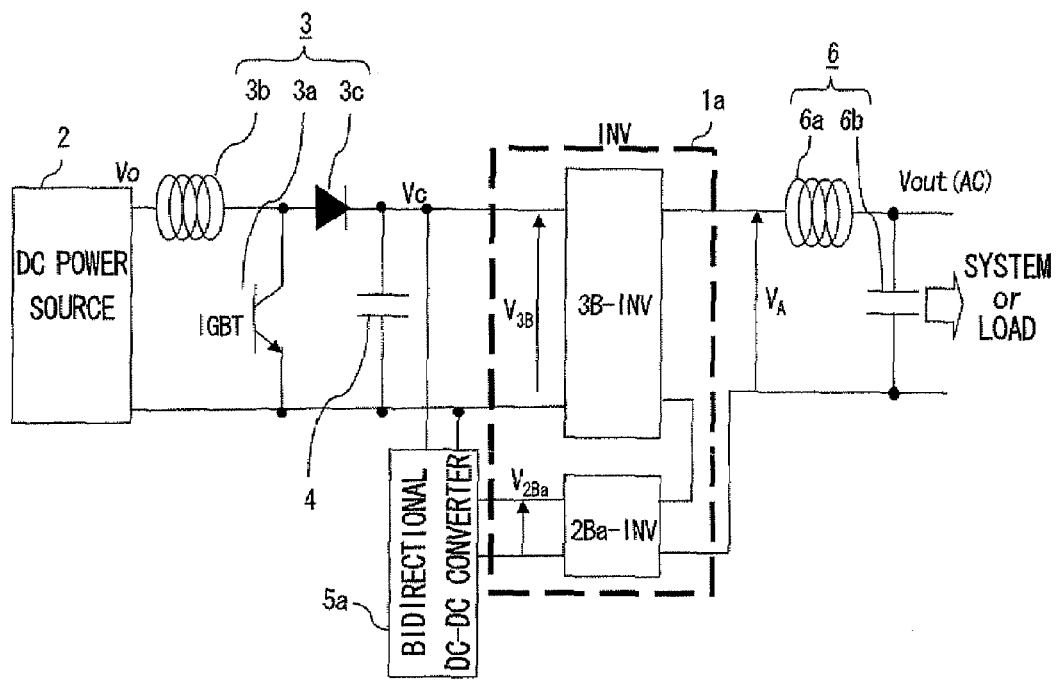
FIG. 14 is a schematic configuration view showing a power conditioner according to Embodiment 6 of the invention.

FIG. 14 is a schematic configuration view showing a power conditioner according to Embodiment 6 of the invention. As shown in FIG. 14, AC sides of plural (in this case, two) single-phase inverters 3B-INV and 2Ba-INV are connected in series to form an inverter unit 1a, which is a single-phase multiple converter. Also, DC power sources (first power source and second power source) $V_{3B}$ and $V_{2Ba}$ that serve as the inputs of the single-phase inverters 3B-INV and 2Ba-INV are connected to a bidirectional DC-DC converter 5a.

Also, a chopper circuit 3 as a booster circuit including a switch 3a such as IGBT, a reactor 3b and a diode 3c is installed on the stage subsequent to a DC power source 2 based on solar light, which is a third DC power source. The chopper circuit 3 boosts a DC voltage $V_O$ acquired at the DC power source 2, and a voltage $V_C (=V_{3B})$ to charge a smoothing capacitor 4, which serves as the first DC power source, is provided. The inverter unit 1a outputs a voltage $V_A$ that is the sum of the generated voltages combined from the single-phase inverters 3B-INV and 2Ba-INV, under gradational output voltage control operation. This output voltage $V_A$ is smoothed by a smoothing filter 6 including a reactor 6a and a capacitor 6b, and an AC voltage $V_{out}$ is supplied to the system or load.

In the power conditioner configured in this manner, it is assumed that the relation between the voltages of the DC power sources $V_{3B}$ and $V_{2Ba}$ of the inverters is $V_{2Ba} \geq (4/9) \times V_{3B}$.

Figure 15:
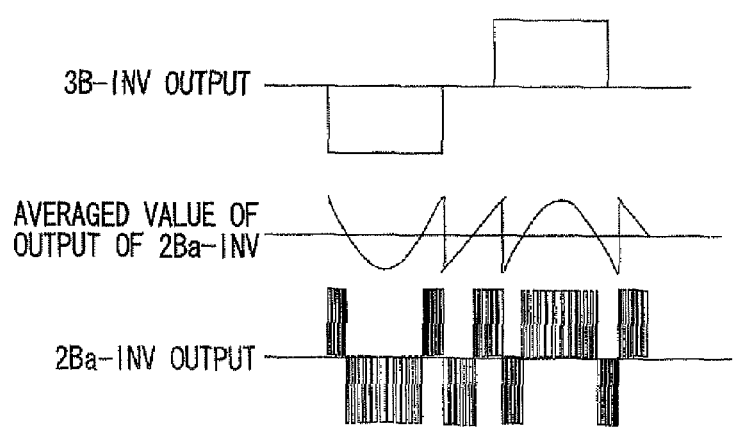
FIG. 15 is a view showing an output voltage waveform of each single-phase inverter according to Embodiment 6 of the invention.

FIG. 15 shows the output voltage waveforms of the inverters 2Ba-INV and 3B-INV. As shown in FIG. 15, the inverter 2Ba-INV is caused to produce an output under PWM control in order to compensate for the difference between the target output voltage and the output voltage of the inverter 3B-INV. In this case, charges are supplied or demanded to the DC-power sources $V_{2Ba}$ of the inverter 2Ba-INV from the DC power source $V_{3B}$ of the inverter 3B-INV via the DC-DC converter 5a.

Also, the chopper circuit 3 that boosts the solar light voltage $V_O$ is caused to operate with the output voltage $V_{3B}$ being $V_{mp} (=(Vm/P) \times 9/13))$, and the rate of voltage use is set at P as shown in FIG. 11 to perform control so that the quantity of power fluctuating in the DC power source $V_{2Ba}$ due to charging and discharging via each inverter becomes zero. Thus, the quantity of power supplied or demanded between the DC power source $V_{2Ba}$ and the DC power source $V_{3B}$ of the inverter 3B-INV via the DC-DC converter 5a can be minimized, and the power loss of the DC-DC converter 5a can be reduced to the minimum. The efficiency of the power conditioner can be improved.

Embodiment 7

Figure 16:
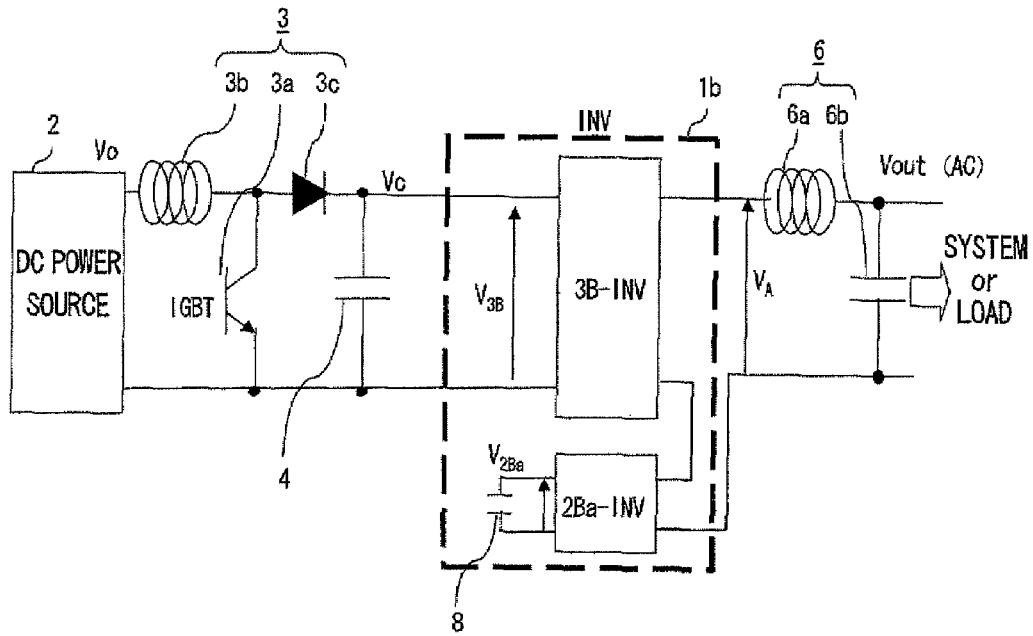
FIG. 16 is a schematic configuration view showing a power conditioner according to Embodiment 7 of the invention.

FIG. 16 is a schematic configuration view showing a power conditioner according to Embodiment 7 of the invention. In the above Embodiment 6, charges are supplied or demanded to the DC power source $V_{2Ba}$ of the inverter 2Ba-INV from the DC power source $V_{3B}$ of the inverter 3B-INV via the DC-DC converter 5a. However, the DC-DC converter 5a can be omitted as shown in FIG. 16 as long as the rate of voltage use can satisfactorily be controlled to P. Here, Reference mark 8 represents a capacitor that forms the DC power source $V_{B2a}$.

That is, when the quantity of power fluctuating in the DC power source $V_{2Ba}$ due to charging and discharging via each inverter can be accurately controlled to be zero, supply and demand of power between the DC power source $V_{2Ba}$ and the DC power source $V_{3B}$ via the DC-DC converter 5a is not necessary, and the power conditioner that does not have the DC-DC converter 5a can be used. Thus, the efficiency of the power conditioner can be improved and the apparatus configuration can be miniaturized and simplified.

Figure 17:
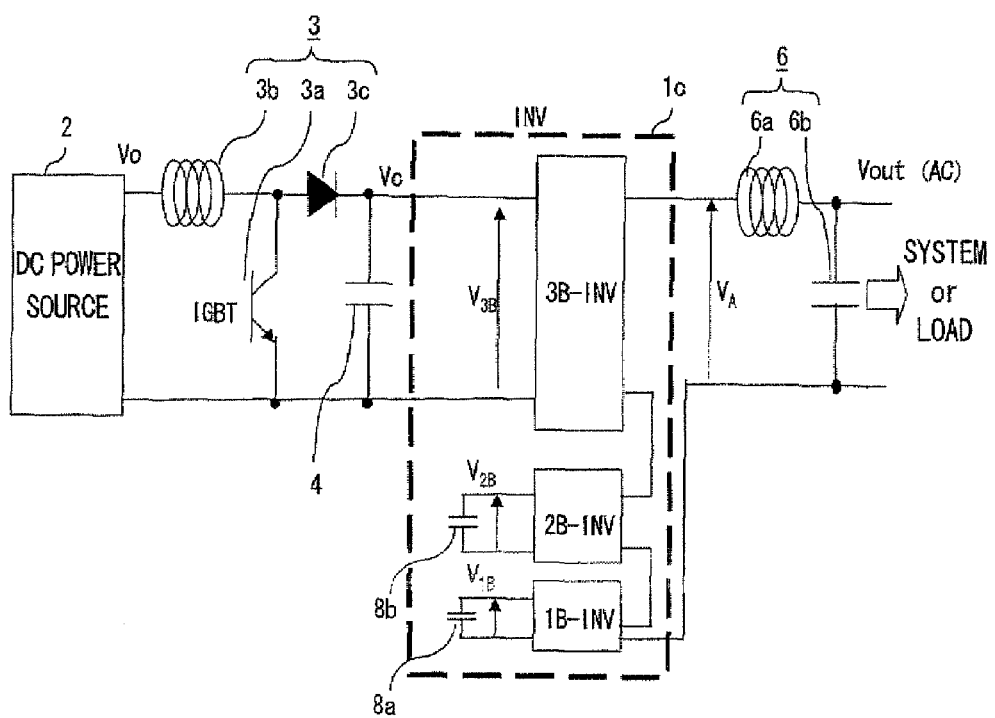
FIG. 17 is a schematic configuration view showing a power conditioner according to another example of Embodiment 7 of the invention.

The same can apply to the case described in the above Embodiment 5. As long as the rate of voltage use can be satisfactorily controlled to P, the DC-DC converter 5 can be omitted as shown in FIG. 17. Here, reference marks 8a and 8b represent capacitors that form the DC power sources $V_{1B}$ and $V_{2B}$. Thus, similarly, the efficiency of the power conditioner can be improved and the apparatus configuration can be miniaturized and simplified.

Embodiment 8

Figure 18:
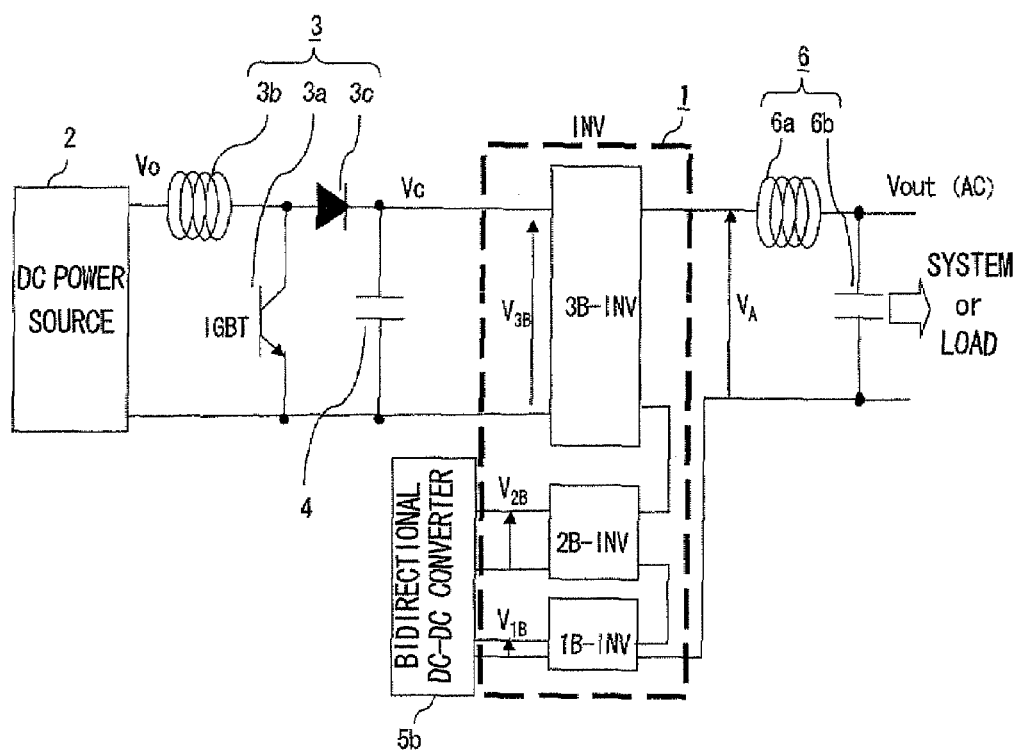
FIG. 18 is a schematic configuration view showing a power conditioner according to Embodiment 8 of the invention.

FIG. 18 is a schematic configuration view showing a power conditioner according to Embodiment 8 of the invention. In the above Embodiment 7, the power conditioner is described in which the DC-DC converter 5 or 5a for supplying and demanding power between the DC power source $V_{3B}$ and the other DC power sources is omitted. However, a DC-DC converter 5b that supplies power only between the DC power sources $V_{1B}$ and $V_{2B}$ may be provided, as shown in FIG. 18.

The inverter unit 1 is configured similarly to the above Embodiment 5, and the relation between the voltages of the DC power sources $V_{1B}$, $V_{2B}$ and $V_{3B}$ of the inverters is $V_{1B}=V_{2B} \geq (2/9) \times V_{3B}$. The rate of voltage use is satisfactorily controlled to P. In this case, the supply and demand of power from the DC power source $V_{3B}$ to the DC power sources $V_{1B}$ and $V_{2B}$ is not necessary, and power is supplied and demanded only between the DC power sources $V_{1B}$ and $V_{2B}$ via the DC-DC converter 5b.

As the DC-DC converter 5b that supplies power only between the DC power sources $V_{1B}$ and $V_{2B}$ in this manner is provided, $V_{1B}=V_{2B}$ does not have to hold and the voltage ratio of the DC power sources $V_{1B}$, $V_{2B}$ and $V_{3B}$ may be, for example, 1:3:9. Also, if there is a point where the sum of the quantities of power fluctuating in the DC power sources $V_{1B}$ and $V_{2B}$ due to charging and discharging via the inverters becomes zero (the rate of voltage use P) and the rate of voltage use can be accurately controlled to P, the voltage ratio of the DC power sources $V_{1B}$, $V_{2B}$ and $V_{3B}$ may be other than 1:3:9.

Also, since the DC-DC converter 5b is for supplying and demanding power only between the DC power sources $V_{1B}$ and $V_{2B}$, its power loss is small and the efficiency of the power conditioner can be improved.

Embodiment 9

Figure 19:
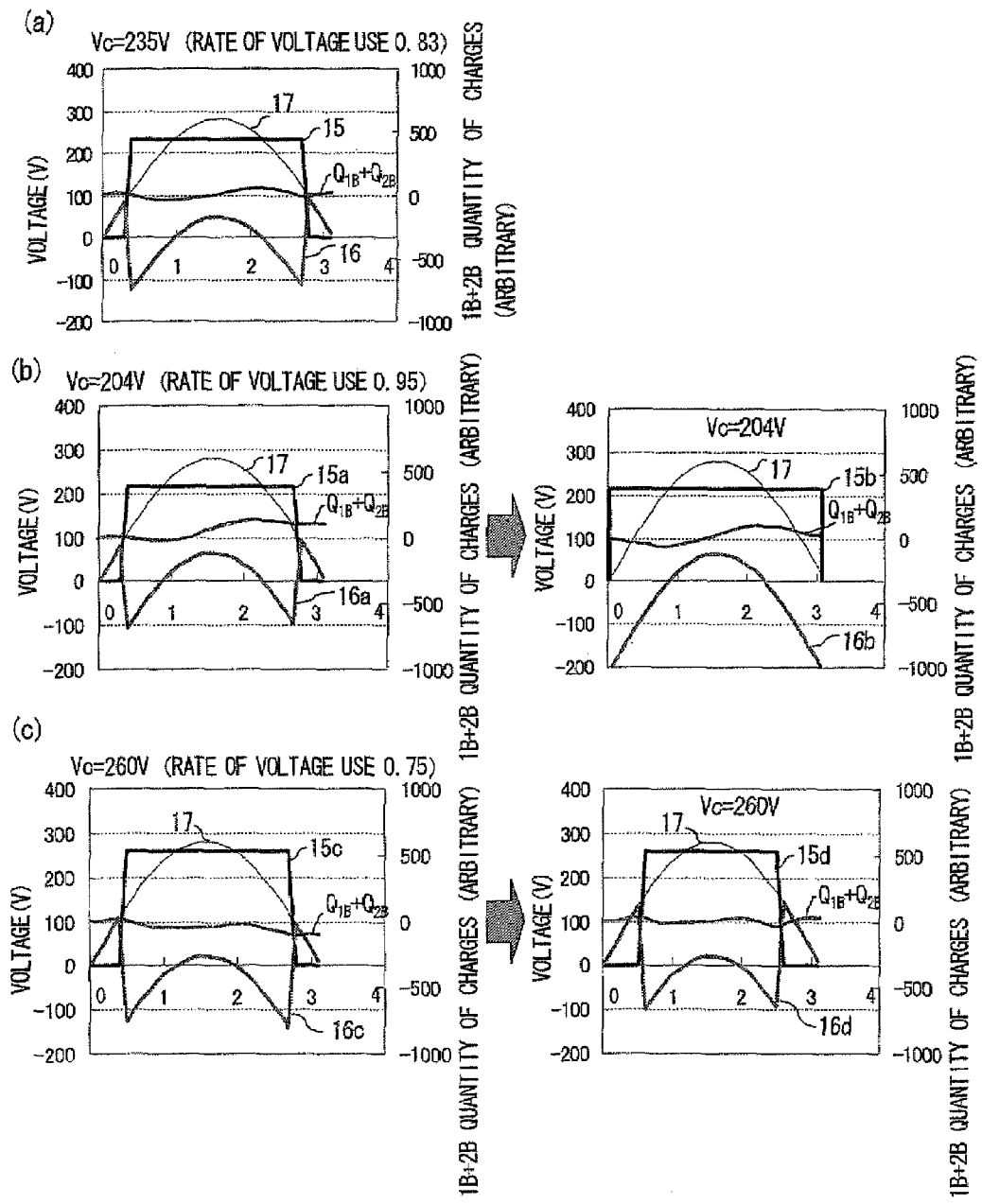
FIGS. 19(a), 19(b), and 19(c) are views explaining output pulse adjustment according to Embodiment 9 of the invention.

In the above Embodiments 4 to 8, the rate of voltage use $Vm/(V_{1B}+V_{2B}+V_{3B})$ of the power conditioner is controlled to be P or Q, thereby causing the quantity of power fluctuating in the DC power sources $V_{1B}$ and $V_{2B}$ due to charging and discharging via the inverters to be zero or minimum. However, in this embodiment, by adjusting the output pulse width of the inverter 3B-INV, the quantities of power of the DC power sources $V_{1B}$ and $V_{2B}$ are adjusted, as shown in FIG. 19.

As shown in FIG. 19(a), when the output voltage Vc ($V_{3B}$) of the chopper circuit 3 of the power conditioner is about 235 V, the rate of voltage use is P (=about 0.83) and the quantity of outflow charges ($Q_{1B}+Q_{2B}$) from the DC power sources $V_{1B}$ and $V_{2B}$ is close to zero. Reference mark 15 represents the output pulse of the inverter 3B-INV, 16 represents the total output from the inverters 1B-INV and 2B-INV, and reference mark 17 represents the AC output voltage $V_{out}$ from the power conditioner.

Next, as shown in FIG. 19(b), when the voltage of solar light is lowered by a rise in the ambient temperature or the like and the output voltage Vc ($V_{3B}$) of the chopper circuit 3 of the power conditioner is, for example, about 204 V, the rate of voltage use is about 0.95 and the quantity of outflow charges ($Q_{1B}+Q_{2B}$) from the DC power sources $V_{1B}$ and $V_{2B}$ increases. In such a case, if the output pulse width of the inverter 3B-INV is increased, the power load of the inverters 1B-INV and 2B-INV is reduced and ($Q_{1B}+Q_{2B}$) becomes closer to zero. Reference marks 15a and 15b represent the output pulse of the inverter 3B-INV before and after the adjustment of the pulse width, and reference marks 16a and 16b represent the total output of the inverters 1B-INV and 2B-INV before and after the adjustment of the pulse width.

Next, as shown in FIG. 19(c), when the voltage of solar light rises because of a drop in the ambient temperature or the like and the output voltage Vc ($V_{3B}$) of the chopper circuit 3 of the power conditioner is, for example, about 260 V, the rate of voltage use is about 0.75 and the quantity of outflow charges ($Q_{1B}+Q_{2B}$) from the DC power sources $V_{1B}$ and $V_{2B}$ decreases, and increases in the negative direction. In such a case, if the output pulse width of the inverter 3B-INV is narrowed, the power load of the inverters 1B-INV and 2B-INV increases and ($Q_{1B}+Q_{2B}$) becomes closer to zero. Reference marks 15c and 15d represent the output pulse of the inverter 3B-INV before and after the adjustment of the pulse width, and reference marks 16c and 16d represent the total output of the inverters 1B-INV and 2B-INV before and after the adjustment of the pulse width.

In this manner, the power load of the inverters 1B-INV and 2B-INV can be easily adjusted by the increase or decrease of the output pulse width of the inverter 3B-INV. Therefore, the quantity of outflow charges ($Q_{1B}+Q_{2B}$) from the DC power sources $V_{1B}$ and $V_{2B}$ can be easily adjusted to approach zero.

Thus, adjustment can be easily made so that the quantity of power fluctuating in the DC power sources $V_{1B}$ and $V_{2B}$ of the inverters 1B-INV and 2B-INV due to charging and discharging via the inverters is reduced. Therefore, the power handled by the DC-DC converter 5 can easily be made closer to zero and the power loss of the DC-DC converter 5 can be reduced. The efficiency of the power conditioner can be improved.

Also in this case, as in the above Embodiment 1, when the solar light voltage $V_O$ exceeds a predetermined voltage $V_{m1}$ (195 V), as the IGBT switch 3a is stopped to stop the boosting operation, the power loss due to the boosting can be significantly reduced as described above, and a power conditioner with higher conversion efficiency can be provided.

INDUSTRIAL APPLICABILITY

The invention can be broadly applied to an uninterruptible power supply apparatus that boosts a DC voltage of a decentralized power source such as solar light to a required voltage and then converts it to AC and links it to a system, or an inverter apparatus that supplies AC power after conversion to a load.

The invention claimed is:

1. A power conversion apparatus comprising:
   a plurality of single-phase inverters having respective inputs and outputs and converting input DC power from respective DC power sources to AC power, the outputs of the single-phase inverters being connected in series, wherein
   the outputs of the single phase inverters connected in series produce an output voltage with gradational output voltage control from a sum of output voltages produced by a combination of the single-phase inverters selected from the plurality of single-phase inverters, and
   the respective DC power sources that provide respective DC voltages input to respective single-phase inverters include a first DC power source producing the highest DC voltage of the DC voltages produced by the respective DC power sources, and at least one second DC power source;
   a booster circuit including a switch, wherein the highest DC output voltage, produced by the first DC power source, is generated from a third DC power source and supplied through the booster circuit, and, when the DC output voltage of the third DC power source exceeds a predetermined voltage, on-off operation of the switch in the booster circuit is stopped to stop boosting; and
   a DC-DC converter connecting the first DC power source to each of the at least one second DC power source.

2. The power conversion apparatus according to claim 1, comprising a bypass circuit that bypasses the booster circuit, wherein, when the voltage of the third DC power source exceeds a predetermined voltage, the on-off operation of the switch in the booster circuit is stopped to stop the boosting, and the booster circuit is bypassed by the bypass circuit.

3. The power conversion apparatus according to claim 2, wherein
   the booster circuit includes a reactor and a rectifying device that are connected in series,
   the switch has a first end connected to a connection point between the reactor and the rectifying device, and
   at least the rectifying device is bypassed by the bypass circuit.

4. The power conversion apparatus according to claim 3, wherein, when a current flowing through the bypass circuit does not exceed a predetermined value, the bypass circuit is opened and the current is switched to a current path via the booster circuit with the boosting stopped.

5. The power conversion apparatus according to claim 2, wherein
   the booster circuit includes a reactor and a rectifying device that are connected in series,
   the switch has a first end connected to a connection point between the reactor and the rectifying device, and
   only the reactor is bypassed by the bypass circuit.

6. The power conversion apparatus according to claim 2, wherein the bypass circuit includes a relay.

7. The power conversion apparatus according to claim 1, wherein the DC voltage produced by the first DC power source is lower than maximum output voltage of the power conversion apparatus.

8. The power conversion apparatus according to claim 1, wherein the at least one second DC power source includes two DC power sources producing substantially equal DC voltages.

9. The power conversion apparatus according to claim 1, wherein the sum of DC voltages produced by the second DC power sources is at least equal to 4/9 of the DC voltage produced by the first DC power source.

10. The power conversion apparatus according to claim 1, wherein the output voltage of a predetermined single-phase inverter of the plurality of single-phase inverters is PWM-controlled, and the PWM-controlled output voltage is combined at each output voltage level to produce the gradational output voltage control.

11. The power conversion apparatus according to claim 1, wherein a predetermined AC voltage and AC current is output by the power conversion apparatus and supplied to a load, or the predetermined AC output by the power conversion apparatus is connected in parallel with a system, and a the third DC power source is linked to the system.

12. A power conversion apparatus comprising:
   a plurality of single-phase inverters having respective inputs and outputs and converting input DC power from respective DC power sources to AC power, the outputs of the single-phase inverters being connected in series, wherein
      the outputs of the single phase inverters connected in series produce an output voltage with gradational output voltage control from a sum of output voltages produced by a combination of the single-phase inverters selected from the plurality of single-phase inverters, and
      the respective DC power sources that provide respective DC voltages input to respective single-phase inverters include a first DC power source producing the highest DC voltage of the DC voltages produced by the respective DC power sources, and second DC power sources;
   a booster circuit including a switch, wherein
      the highest DC voltage, produced by the first DC power source, is generated by a third DC power source and supplied through the booster circuit,
      output voltage of the booster circuit is set so that total power fluctuation due to charging and discharging of the respective second DC power sources via respective single-phase inverters does not exceed a predetermined quantity; and
      the output voltage of the booster circuit is set so that the total power fluctuation in respective second DC power sources due to charging and discharging via respective single-phase inverters is substantially zero.

13. The power conversion apparatus according to claim 12 including a DC-DC converter connecting respective second DC power sources to each other.

14. The power conversion apparatus according to claim 12, wherein peak value of the output voltage of the power conversion apparatus divided by the sum of the DC voltages produced by the first and second DC power sources, is controlled to be within a range from 0.8 to 0.9.

15. The power conversion apparatus according to claim 12, wherein the total power fluctuation in respective second DC power sources via respective single-phase inverters is the sum of respective power fluctuations in respective second DC power sources or the sum of absolute value of respective power fluctuations.

16. The power conversion apparatus according to claim 12, wherein, when the voltage of the third DC power source exceeds a predetermined voltage, on-off operation of the switch in the booster circuit is stopped to stop boosting.

17. The power conversion apparatus according to claim 12, wherein the voltage produced by the first DC power source is lower than maximum output voltage of the power conversion apparatus.

18. The power conversion apparatus according to claim 12, including two second DC power sources producing substantially equal DC voltages.

19. The power conversion apparatus according to claim 12, wherein the sum of DC voltages produced by the second DC power sources is at least equal to 4/9 of the DC voltage produced by the first DC power source.

20. The power conversion apparatus according to claim 12, wherein the output voltage of a predetermined single-phase inverter of the plurality of single-phase inverters is PWM-controlled, and the PWM-controlled output voltage is combined at each output voltage level to produce the gradational output voltage control.

21. The power conversion apparatus according to claim 12, wherein a predetermined AC voltage and AC current is output by the power conversion apparatus and supplied to a load, or the predetermined AC output by the power conversion apparatus is connected in parallel with a system, and the third DC power source is linked to the system.

22. A power conversion apparatus comprising:
   a plurality of single-phase inverters having respective inputs and outputs and converting input DC power from respective DC power sources to AC power, the outputs of the single-phase inverters being connected in series, wherein
      the outputs of the single phase inverters connected in series produce an output voltage with gradational output voltage control from a sum of output voltages produced by a combination of the single-phase inverters selected from the plurality of single-phase inverters, and
      the respective DC power sources that provide respective DC voltages input to respective single-phase inverters include a first DC power source producing the highest DC voltage of the DC voltages produced by the respective DC power sources, and second DC power sources;
   a booster circuit including a switch, wherein the highest DC voltage, produced by the first DC power source, is generated by a third DC power source and supplied through the booster circuit; and
   a DC-DC converter, wherein
      the first DC power source and each of the second DC power sources are connected to each other via the DC-DC converter, and
      output pulse width of the single-phase inverter that receives the DC voltage produced by the first DC power source is adjusted so that total power fluctuation due to charging and discharging of respective second DC power sources via respective single-phase inverters is reduced.

23. The power conversion apparatus according to claim 22, wherein the total power fluctuation in respective second DC power sources via respective single-phase inverters is the sum of respective power fluctuations in respective second DC power sources or the sum of absolute value of respective power fluctuations.

24. The power conversion apparatus according to claim 22, wherein, when the voltage of the third DC power source exceeds a predetermined voltage, on-off operation of the switch in the booster circuit is stopped to stop boosting.

25. The power conversion apparatus according to claim 22, wherein the DC voltage produced by the first DC power source is lower than maximum output voltage of the power conversion apparatus.

26. The power conversion apparatus according to claim 22, including two second DC power sources producing substantially equal DC voltages.

27. The power conversion apparatus according to claim 22, wherein the sum of DC voltages produced by respective second DC power sources is at least equal to 4/9 of the DC voltage of produced by the first DC power source.

28. The power conversion apparatus according to claim 22, wherein the output voltage of a predetermined single-phase inverter of the plurality of single-phase inverters is PWM-controlled, and the PWM-controlled output voltage is combined at each output voltage level to produce the gradational output voltage control.

29. The power conversion apparatus according to claim 22, wherein a predetermined AC voltage and AC current is output by the power conversion apparatus and supplied to a load, or the predetermined AC output by the power conversion apparatus is connected in parallel with a system, and the third DC power source is linked to the system.

30. A power conversion apparatus comprising:

a plurality of single-phase inverters having respective inputs and outputs and converting input DC power from respective DC power sources to AC power, the outputs of the single-phase inverters being connected in series, wherein the outputs of the single phase inverters connected in series produce an output voltage with gradational output voltage control from a sum of output voltages produced by a combination of the single-phase inverters selected from the plurality of single-phase inverters, and the respective DC power sources that provide respective DC voltages input to respective single-phase inverters include a first DC power source producing the highest DC voltage of the DC voltages produced by the respective DC power sources, and second DC power sources;

a booster circuit including a switch, wherein the highest DC voltage, produced by the first DC power source, is generated by a third DC power source and supplied through the booster circuit, and output voltage of the booster circuit is set so that total power fluctuation due to charging and discharging of the respective second DC power sources via respective single-phase inverters does not exceed a predetermined quantity; and a DC-DC converter connecting the first DC power source to each of the second DC power sources.

* * * * *